United States Patent [19]

Dubois et al.

[11] 4,277,225

[45] Jul. 7, 1981

[54] ROTOR FOR JET ENGINES

[75] Inventors: Claude Dubois, Vert St Denis; Jean M. Surdi, Melun, both of France

[73] Assignee: Societe Nationale d'Etude et de Construction de Moteurs d'Aviation, Paris, France

[21] Appl. No.: 944,205

[22] Filed: Sep. 20, 1978

[30] Foreign Application Priority Data

Sep. 23, 1977 [FR] France ................. 77 29240

[51] Int. Cl.³ ............................................. F01D 5/06
[52] U.S. Cl. ........................... 416/198 A; 416/193 A; 416/201 R
[58] Field of Search .......... 416/198 A, 193 A, 201 R, 416/219 R, 221; 415/199.5

[56] References Cited

U.S. PATENT DOCUMENTS

| 2,461,402 | 2/1949 | Whitehead | 416/201 |
| 2,743,080 | 4/1956 | Feilden | 416/201 |
| 2,751,189 | 6/1956 | Ledwith | 416/221 |
| 2,967,043 | 1/1961 | Dennis | 416/221 |
| 3,008,689 | 11/1961 | Morley et al. | 416/221 |
| 3,294,364 | 12/1966 | Stanley | 416/219 |
| 3,692,429 | 9/1972 | Redding | 416/219 X |
| 3,801,220 | 4/1974 | Beckershoff | 416/198 A |
| 3,894,324 | 7/1975 | Holzapfel et al. | 416/198 A |
| 3,986,779 | 10/1976 | Beckershoff | 416/221 X |

FOREIGN PATENT DOCUMENTS

| 1953711 | 4/1970 | Fed. Rep. of Germany | 416/220 |
| 157966 | 2/1957 | Sweden | 416/198 |
| 341030 | 10/1959 | Switzerland | 416/198 A |
| 1184687 | 3/1970 | United Kingdom | 416/198 A |
| 1236920 | 6/1971 | United Kingdom | 416/198 A |

Primary Examiner—Everette A. Powell, Jr.

[57] ABSTRACT

A rotor for jet engines includes a drum formed by disks and carrying blades. Between the blades of two adjacent stages, braces are interspaced, the braces being projections which engage in sockets provided for this purpose on the disks. Each disk has two series of sockets, one receiving the roots of the blades, and the other, interspaced between the preceding, the projections of the braces. The blades are immobilized in translation at the upstream end by one ring and downstream by another ring, against which the roots of the blades of the terminal stages abut. The invention is particularly applicable to the building of axial type compressor rotors having several stages.

7 Claims, 3 Drawing Figures

ROTOR FOR JET ENGINES

BACKGROUND OF THE INVENTION

This invention concerns a rotor for a turbine engine and means to fasten blades to the rotor; it may be applied with particular advantage to compressors of the axial type.

Compressors of this type, used mainly in jet engines, consist of a rotor comprising a succession of disks which carry the blades of the several stages, themselves attached to a stationary piece, intervene in said spaces. The invention may be applied to rotors comprising disks with identical diameters, and annular elements interspaced between said disks, also with identical diameters, albeit smaller than those of the disks. The rotors may be of the single block type, i.e. they may consist of a single drum, with the annular elements consisting of cuts machined into said drum, or of an alternating succession of disks and annular elements, assembled by means of welding or by force fitting and the annular elements serving as spacers; they may also be assembled in a removable manner and fastened in such a case by tie rods, for example. The convergence of the flow of gas for the compressor is mainly assured by letting the diameter of the stationary part decrease from upstream to downstream and/or possibly by the positioning of platforms with respect to the cuts of the disks.

In the known compressors of the axial type, the blades are in general attached individually to the durm. For this purpose, the disks carrying the blades are equipped with sockets which are distributed uniformly and equal in number to that of the blades, the configuration of said sockets designed to cooperate with the shape of the roots of the blades which insures the radial fastening of the blade, by means, for example, of a fastener of the dovetail type. Concerning the radial mounting of the blade, or more generally, its fastening in relation to the translation of the root of the blade with respect to its socket, if the latter is not axial, it is assured most frequently, separately for each blade, by a system of balls, set pins, clamps, etc. It is also known to fasten the blades in the axial direction by means of bracing devices and this is the type of fixation that the present invention proposes to improve.

SUMMARY OF THE INVENTION

The rotor of a compressor to which the present invention applies, consists of an alternating stack of disks and of annular elements having an external diameter smaller than that of the disks, the parts being removable or not, as desired. In a preferred embodiment, the disks have the same external diameter. Each of the disks has an equal number of sockets extending in an axial direction for the roots of the blades and arranged in alignment from one end of the rotor to the other. Said sockets forming a uniformly distributed series of grooves over the periphery of the rotor. The width of a disk carrying blades, measured in the axial direction, is greater than the length of the root of the blade to be lodged in it; with the blade in place, the socket extends beyond each side of the root of said plate and is engaged by a projection of a brace having the shape of the root of the blade and which is secured radially in the socket of the disk. Each brace comprises a platform and two projections, aligned axially with respect to the rotor, one on each end. The mounting of blades on such a rotor is simple; after the blades of the downstream stage are in place and secured in translation in the downstream direction by a ring carried by the rotor, the braces are mounted, with one of their projections engaging the socket of the blade of the stage downstream and the other projection hooking into the socket of the blade, in alignment with the preceding one, of the stage located directly upstream. Once the platforms of the braces are in place, they form an essentially continuous ring defining the flow of gas; they may possibly carry tongues designed to cooperate with a stationary element in forming a labyrinth joint. The blades of the stage immediately upstream of the stage installed are then put in place, they will be supported by the projections of previously installed braces, and so on; the assembly of stages mounted in this manner is locked in place by a ring, against which the upstream face of the blade roots of the upstream stage of the compressor are pressed. Each blade comprises a platform above its root, the entirety of the platforms of the blades of one stage, once installed, also form an essentially continuous crown. Such a mode of securing the blades is described in connection with a light rotor of a fibrous material in French Patent No. 2,143,561, in the name of the present applicant. In the case of metal rotors and particularly in aircraft applications, in which the designers constantly endeavor to reduce masses, it has been envisaged, in order to lighten the compressor, to reduce the width of the disks to which the blades are fastened. In the case where the blades are secured in the manner described herein, this endeavor is not without danger, because it involves a reduction of the length of the engagement of the projections of the braces. It may thus occur in an assembly including an unfavorable succession of tolerances that a brace is ejected, with all of the consequences such an event would imply.

The invention, therefore, proposes the construction of a metal rotor of the type referred to hereabove in which the width of the disks carrying the blades is reduced to a minimum, i.e. essentially to the axial length of the root of a blade, but without the disadvantage mentioned above. For this purpose, each glade carrying disk comprises two series of axial grooves uniformly distributed and each equal in number to that of the blades, the grooves of one series being aligned from one end of the rotor to the other. The grooves of the first series have a shape adapted to each receive a root of a blade. The grooves of the second series, interspaced between the preceding grooves, are of a shape adapted to receive the identical projections of the braces, equal in number to the blades, thus assuring the axial immobilization of the blades, due to a platform. The shapes of the grooves of the first and the second series are such that they cooperate respectively with the roots of the blades and the projections of the braces, thus producing a joint of the dovetail type inhibiting any radial movement, with respect to the rotor, the blades and the braces.

The axial fastening of the blades thus is no longer by means of the projections of the braces, but directly by means of the platforms of said braces. For this purpose, the platforms extend essentially circumferentially with respect to the rotor over a length, equal to the pitch of the series of sockets intended for the roots of the blades and symmetrically with respect to the median axial plane of the projections. This arrangement thus provides a sufficient length of projection of the braces to insure their maintenance in place. The multiplication of the sockets results in another reduction in mass, particularly in the case where the braces are made of a material of lesser density than that of the rotor. This multiplication of the sockets has the advantageous effect of preventing the opening up of the lines of stress in the teeth formed between two sockets and of eliminating the points of stress concentration. This arrangement has another advantage in the case where all of the sockets are of the same configuration, i.e. that of making possible the interchange of the blade sockets and braces following an inspection, if the more heavily loaded blade sockets have deteriorated beyond tolerance; this extends the life of the disk without having to resort to replacement or remachining.

BRIEF DESCRIPTION OF THE DRAWINGS

The following description refers to the figures attached hereto and presents a possible mode of embodiment of the process of securing the blades to a compressed rotor in accordance with the present invention.

DESCRIPTION OF THE PREFERRED EMBODIMENT

Figure 1:
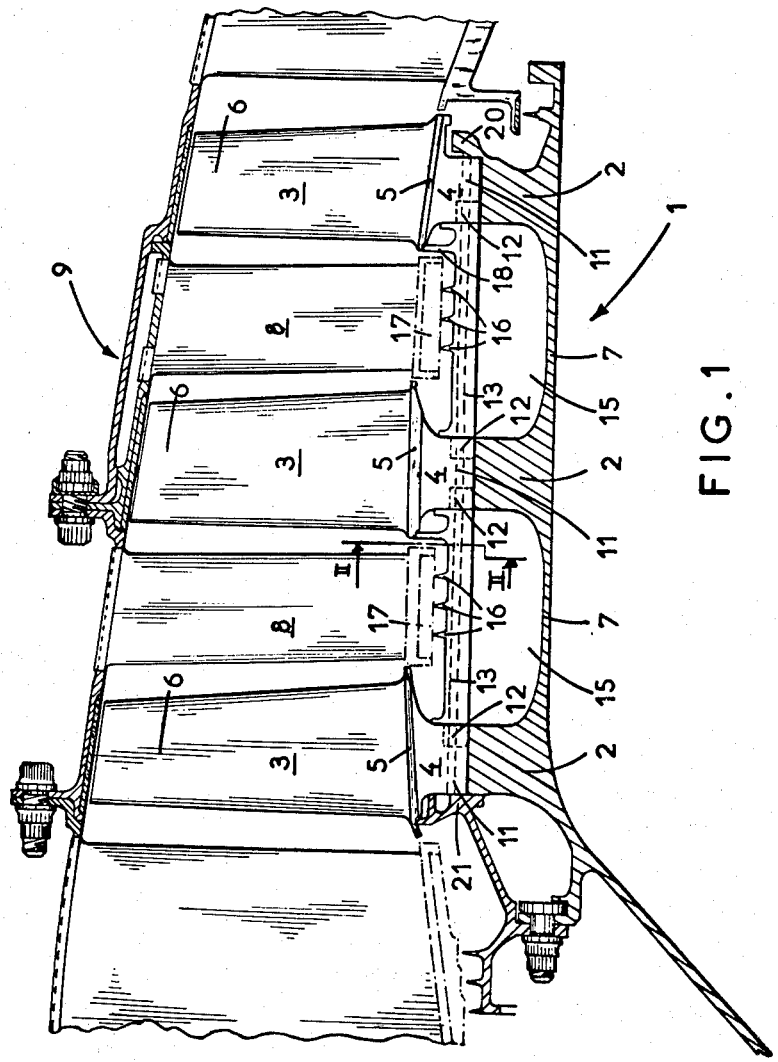
FIG. 1 is a semisection of a compressor, on a plane containing its axis, the rotor blades of said compressor being fastened by means according to the invention.
Figure 2:
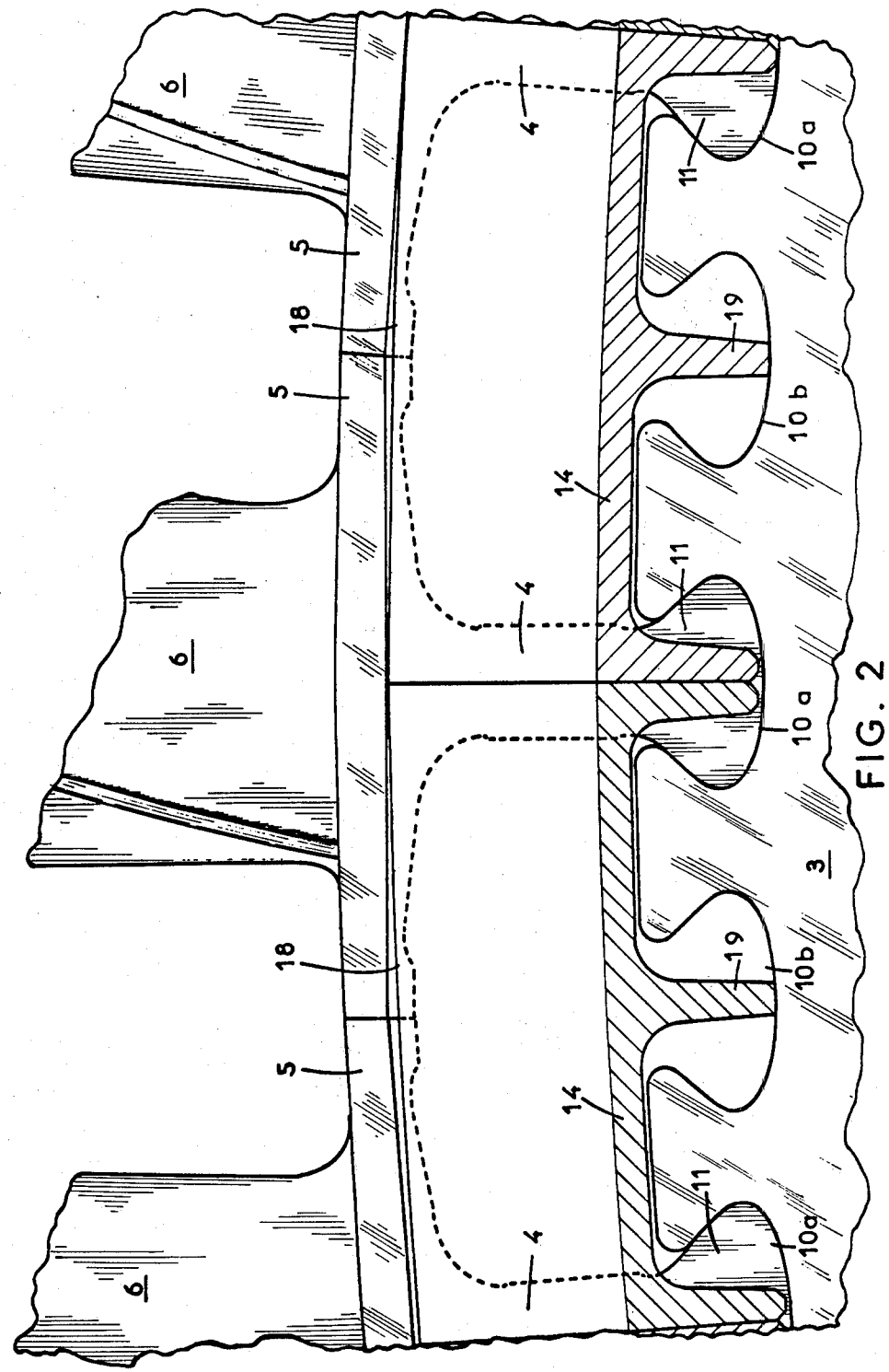
FIG. 2 is a section on the line II—II of FIG. 1 on a magnified scale.

In FIG. 1, the rotor 1 is of a single block and is formed to define the disks 2 carrying the blades 3, each of which is composed of a root 4, a platform 5 and an airfoil portion 6. Between each pair of disks 2, a space 7, obtained by machining, is formed. The space may be realized by means of a removable ring separating the disks and being the equivalent of a machined space. This arrangement results in the definition between each rotor stage of a space occupied by the stationary blades 8, fastened to a stationary piece 9, made in a known manner, for example, in the form of a succession of rings, which nest within each other. Each of the disks 2 is of a width, measured in the axial direction, equal to the axial length of the blade roots. Each disk comprises two series of uniformly distributed sockets, such as 10a and 10b, (FIG. 2), the total number of sockets being double the number of blades; in a preferred embodiment, the sockets 10a and 10b have identical configurations. This simplifies fabrication and has advantages in maintenance, but it should be understood that the sockets may have different configurations. The sockets in fact constitute axial grooves extending from one end to the other of the rotor and may consequently be produced by machining of the assembly. A first series of sockets, for example, such as 10a, receives the bulbs 11 of the roots of the blades. The form of the sockets chosen in the figures is not limiting, in actual fact the sockets and the roots of the blades must have complementary configurations with respect to each other, in order to form an assembly insuring the securing of the blades in the radial direction with respect to the rotor. They are, for example, of the dovetail type.

Figure 3:
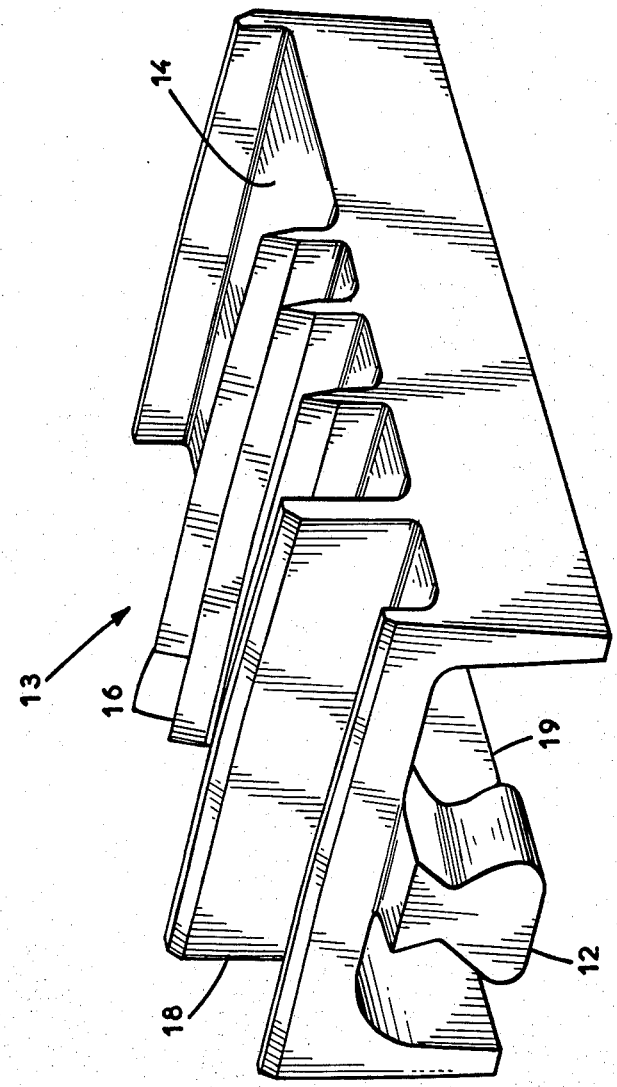
FIG. 3 is a large scale perspective view of a securing brace.

The sockets 10b of the second series are thus left free to receive the projections 12 of the braces 13, which are identical, the shape of said projections being adapted to cooperate with the grooves 10b in the same manner as the roots of the blades and the grooves 10a. Each brace 13 (FIG. 3) consists of a platform 14, the axial length of which corresponds to the distance separating two adjacent disks 2. The platform 14 extends circumferentially, with respect to the rotor, and symmetrically with respect to the axis of the sockets of their projections. They press against the roots of the blades, thus insuring the axial immobilization of the blades. The circumferentially adjacent platforms 14 are in abutment so as to form, once in place, a continuous ring covering the space 15 between two adjacent disks 2. These platforms may also carry tongues 16, which cooperate with the elements 17 carried by the inner ends of the stationary blades 8 to form an airtight joint. Each brace comprises in addition, in the particular cases where the blade platforms 5 are not aligned with those 14 of the braces, a partition 18, which cooperates with the blades to prevent the circulation of gases between the roots 4 of the blades. Each brace has a longitudinal rib 19, the two ends of which form the projections 12, the central portion of said rib being located under the platform 14 and is relatively thin to reduce weight. It is advantageous to make the braces of a material having a lesser density than the material used in the rotor, for example, a light alloy. It should be noted that the axial length of a projection is such that it will not butt against the projection of the following brace, engaged in the same socket.

The rotor of the invention is assembled by starting for example at the downstream end of the rotor. A ring 20 attached to the rotor, removably or not, is at its downstream end, the blades of the downstream stage are then placed, each in its socket, their roots engaging the ring 20 which thus forms a downstream stop for them. The braces are put into place by sliding them from the upstream end of the rotor and placing their projections in the sockets left free so that their platforms abut against the upstream part of the blades carried by the downstream disk. The next stage of blades is then placed so that they abut against the platforms of the preceding braces, and so on. When the stage farthest upstream has been mounted, a second ring 21 is fastened to the rotor. The upstream face of the roots of the blades of the upstream stage will be engaged by the ring 21 which forms an upstream stop. The blade assembly thus is secured axially by means of the cooperation of the roots of the blades and the platforms of the braces for the intermediate stages and by means of the rings at the upstream and downstream ends. It should be noted that the ring 20 may be an integral part of the rotor or designed as an independent unit, however, for reasons of ease of installation and in view of later alterations, it is necessary that one of the rings 20, 21 be readily removable.

We claim:

1. An axial type rotor for jet engines, particularly for compressors, having an alternating stack of disks and of annular elements having external diameters smaller than those of said disks so as to provide spaces for stationary blades, each stage of said rotor comprising a number of identical blades, characterized in that in each disk two series, each comprising uniformly distributed axial grooves equal in number to that of the blades, are arranged, the grooves of a first series being aligned from one end of the rotor to the other, with the grooves of said first series having a configuration adapted to receive a root of a blade, the grooves of the second series, interspaced between those of said first series and having a configuration adapted to receive identical projections of braces equal in number to that of the blades, said projections insuring the axial immobilization of the blades by means of a platform carried by said braces and abutting said blades, the configuration of the grooves of the first and second series being such that said grooves cooperate respectively with the roots of the blades and the projections of the braces, to assure a joint impeding of all radial motion with respect to the rotor of the blades and of the braces.

2. A rotor according to the preceding claim, characterized in that the width, measured in the axial direction, of each disk is essentially equal to the axially measured length of a root of a blade.

3. A rotor according to any one of the preceding claims, characterized in that each brace consists of a platform of an axial length corresponding to the space separating two blade-carrying disks, said platform extending circumferentially in a symmetrical fashion and with the platforms of adjacent braces cooperating so as to form an annular surface virtually continuous, once the braces are set in place, and of two aligned projections extending axially past the platform into the grooves of the second series of two adjacent blade carrying disks.

4. A rotor according to claim 3, characterized in that the platforms of the braces carry sealing devices for cooperation with the inner ends of stationary blades.

5. A rotor according to claim 3, characterized in that the braces are made of a material having a density lower than the material used for the rotor.

6. A rotor according to claim 3, characterized in that the configurations of the grooves of the first and second series are identical, the shapes of the roots of the blades and of the projections of the braces also being identical.

7. A rotor according to claim 3, characterized in that the locking in place of the blade assembly, once installed, is provided by means of a first ring forming a stop at the upstream face of the roots of the blades of the upstream stage and a second ring forming a stop at the downstream face of the roots of the blades of the downstream stage, the two rings being secured to the rotor so that at least one of them is removable.

* * * * *